March 15, 1960 H. PETERSEN 2,928,479
SIDEWALK AND CURB EDGER
Filed March 14, 1958 2 Sheets-Sheet 1

INVENTOR.
HAROLD PETERSEN,
BY
McMorrow, Berman + Davidson
ATTORNEYS.

March 15, 1960 H. PETERSEN 2,928,479
SIDEWALK AND CURB EDGER
Filed March 14, 1958 2 Sheets-Sheet 2

INVENTOR.
HAROLD PETERSEN,
BY
McMorrow, Berman & Davidson
ATTORNEYS.

United States Patent Office 2,928,479
Patented Mar. 15, 1960

2,928,479
SIDEWALK AND CURB EDGER

Harold Petersen, Denton, Tex.

Application March 14, 1958, Serial No. 721,529

9 Claims. (Cl. 172—16)

This invention relates to improvements in rotary blade edgers for edging lawns along sidewalks and curbs, and more particularly to an improved hand-guided motor-driven device of this kind having a single curb or sidewalk-engaging wheel, a horizontal axis bladed rotary edging rotor, a curb or sidewalk engaging means which includes a shoe to ride along the upper surface of a curb or sidewalk, and a depending guide plate to ride along an edge of a curb or sidewalk, and means for vertically oscillating the said means for loosening lawn sod on a curb or sidewalk in advance of the rotor.

The primary object of the invention is to provide an efficient, effective and simple device of the character indicated above which is composed of a small number of simple and easily assembled parts, and can be manufactured at relatively low cost, and wherein the guide plate prevents contact of the rotor with an edge of a curb or sidewalk along which the device is moved.

Other important objects and advantageous features of the invention will be apparent from the following description and the accompanying drawings, wherein, for purposes of illustration only, a specific form of the invention is set forth in detail.

Figure 1:
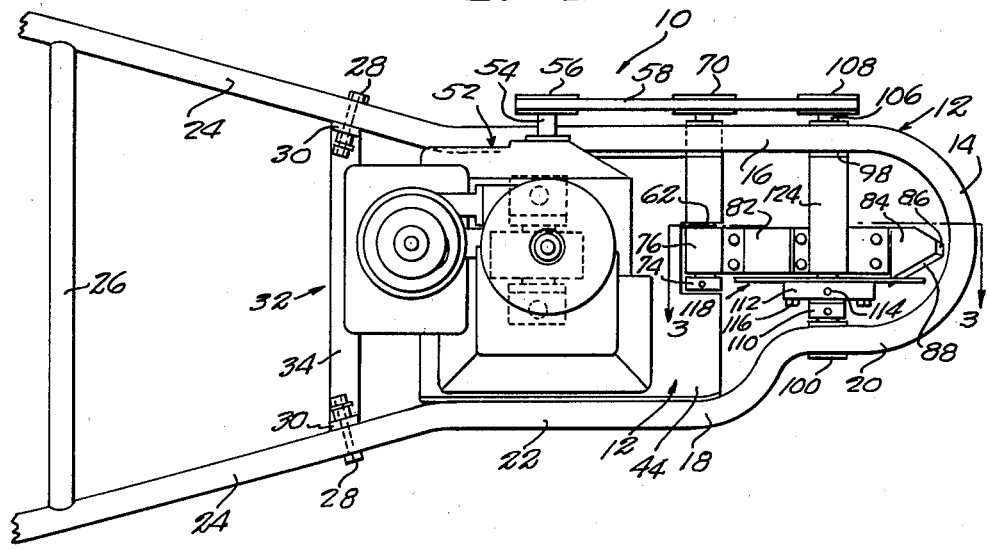
Figure 1 is a top plan view of a device of the invention.

Referring in detail to the drawings, wherein like numerals designate like parts throughout the several views, the illustrated device, generally designated 10, comprises a longitudinally elongated, horizontal U-shaped frame 12, preferably made of a single length of metal tubing, and having a front end bight portion 14, a first straight side member 16, a second side member 18 having a short forward portion 20, and a long straight rear portion 22, both parallel to the first side member 16, with the rear portion 22 spaced from the first member 16 at a greater distance than the forward portion 20. The first and second side members 16 and 18 terminate at their rearward ends in upwardly and rearwardly inclined, diverging handles 24, which are spaced and connected by a cross bar 26.

On a level only slightly above the side members 16 and 18, horizontal bolts 28 traverse the handles 24 and the upper ends of the vertical arms 30 of a U-shaped stand or rest 32, whose bight portion 34 is normally on a level below the side members 16 and 18, and is adapted to rest upon the upper surface 36 of a sidewalk or curb 38, with the frame 12 tilted rearwardly, so as to support the device 10 while not being used in an edging operation. The stand 32 swings freely on the pivot bolts 28.

Secured, as by weldings 40, to the inner side of a rear part of the frame side member 16 and to the inner side of the rear portion 22 of the frame side member 18 is a U-shaped cross section motor mounting base 42, having a depressed bottom wall 44 having a free forward edge 46.

Fixed to the underside of the bottom wall 44 at a point between the rear and front edges of the motor base 42 and slightly offset toward the frame side member 16 is a bracket 48 journaling a single preferably solid rubber curb or sidewalk-engaging wheel 50.

Secured upon the motor base 42 at the center of gravity of the device 10 is a suitable motor 52, such as a gasoline engine, having a drive shaft 54 reaching laterally outwardly over and beyond the frame side member 16 and having thereon a V-belt pulley 56, over which is trained an endless V-belt 58.

Figures 3, 4:
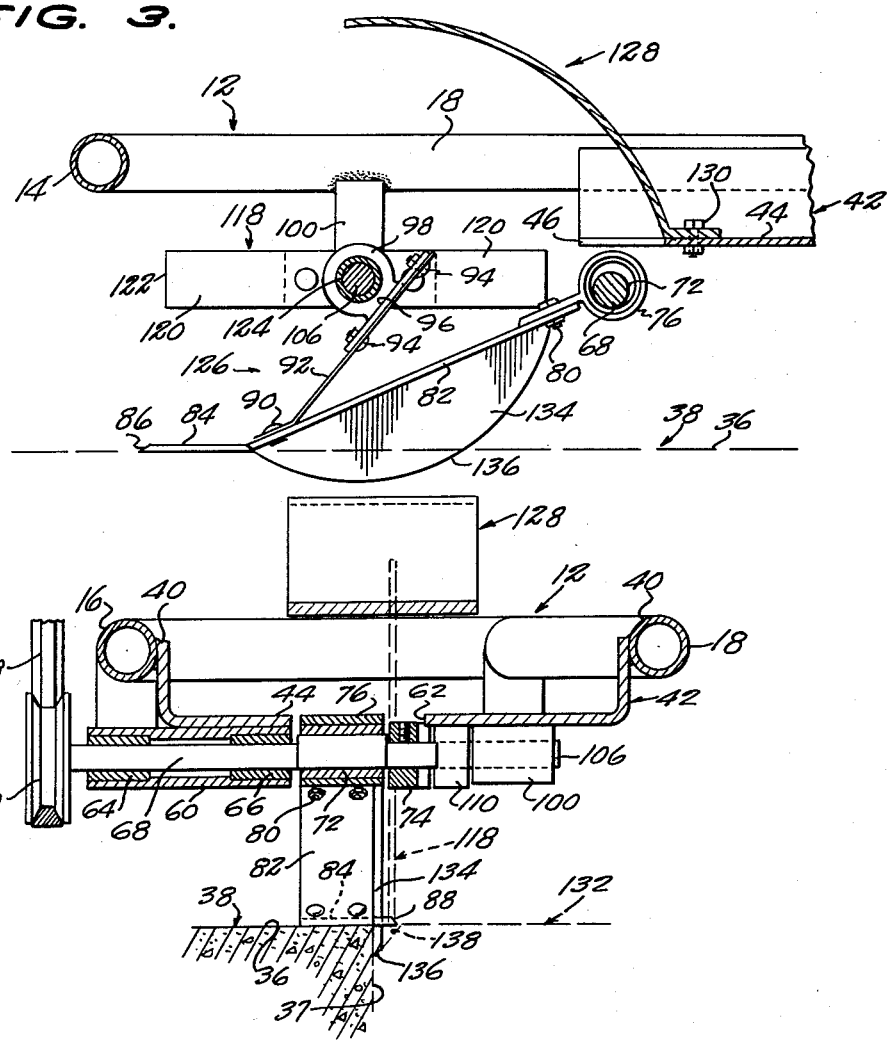
Figure 3 is an enlarged fragmentary vertical longitudinal section taken on the line 3—3 of Figure 1.
Figure 4 is an enlarged vertical transverse section taken on the line 4—4 of Figure 2.

Secured, in suitable manner, as shown in Figure 4, to the underside of the motor base bottom wall 44 at the forward edge 46 thereof is a transverse horizontal bearing sleeve 60, which reaches between a central notch 62 in the forward edge 46 to a point slightly beyond the frame side member 16, and in which are secured bearings 64 and 66. A rotary eccentric shaft 68 is journaled through the bearings 64 and 66 and has a belt pulley 70 on its outer end, and has journaled thereon within the notch 62 an eccentric sleeve 72. Secured on the inward end of the shaft 68 is a thrust collar 74, which confines the eccentric sleeve 72 between the bearing sleeve 60 and the collar 74.

Figure 2:
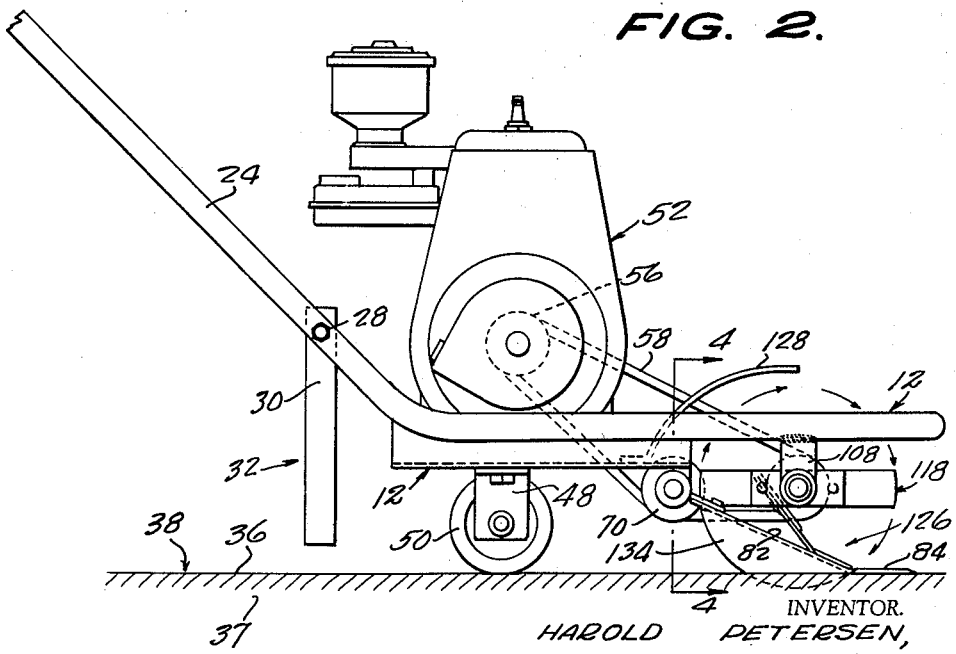
Figure 2 is a right hand side elevation thereof, in relation to a curb or sidewalk.

Journaled on the eccentric sleeve 72 is a journal bracket 76 having a forwardly declining arm 78 to which is bolted, as indicated at 80, the elevated rear end of a forwardly declining longitudinally elongated spring plate 82, which terminates at its lower end in a horizontal, forwardly extending shoe plate 84 of triangular shape. The shoe plate 84 as seen in Figures 1 and 2, has a beveled forward cutting point 86 and a beveled side cutting edge 88 which faces toward the frame side member 18.

Bolted, as indicated at 90, upon the forward depressed end of the plate 82, is the lower end of a rearwardly inclined brace bar 92, whose upper end is bolted, as indicated at 94, to spaced points of a plate 96 on the underside of a journal bracket 98.

At points spaced forwardly from the eccentric shaft 72, journal brackets 98 and 100 are fixed on and depend from a forward part of the frame side member 16 and the forward portion 20 of the frame side member 18, in which are journaled related end portions of a transverse rotor shaft 106 having thereon a pulley 108 in line with the pulleys 56 and 70, and over which the belt 58 is trained.

A thrust and spacer collar 110 is secured on the rotor shaft 106 between the bearing bracket 100 and a rotor block 112 which is circumposed on the shaft 106 and is secured thereto, as by a set screw 114. The rotor block 112 has secured on the side thereof remote from the collar 110, as by bolts 116, and circumposed on the shaft 106, an edging rotor, which is generally designated 118, and which works along the side of the declining plate 82 facing the frame side member 18 and adjacent to the cutting edge 88 of the shoe plate 84.

The rotor 118 comprises a diametrically elongated plate having a central portion secured to the block 112 and defining two elongated rectangular blades 120 having bevelled cutting edges 122 on their radially outward ends.

A preferably cylindrical housing 124, which is fixed at one end to the bearing bracket 98 and has its other end closed to the rotor 118, is circumposed on the rotor shaft 106 and has a fixedly circumposed thereon the journal bracket 98, so that the housing 124 constitutes a pivot and stabilizer for the shoe assembly 126 which includes the plate 82, the shoe plate 84, and a guide plate 134, during vertical oscillation of the assembly 126 incidental to operation of the motor 52.

A quarter circular grass deflector arm 128 is secured at 130 to its rear end upon the motor base bottom wall 44 near its forward edge 46, as shown in Figures 2 and 3, and extends forwardly above and over the rotor 118.

In operation, with the motor 52 running and the handles 24 held to give the frame 12 a generally horizontal position, as shown in Figure 2, so as to apply the shoe plate 84 flat upon the upper surface 36 of a curb or sidewalk 38, and with the single wheel 50 riding upon the surface 36, at the side edge 37 of the curb or sidewalk 38, in line with the wheel as shown in Figure 4, the blades 120 of the rotor 118 are positioned to work alongside of the edge 37, and the cutting ends 122 of the rotor blades cut to a level below the surface 36, and thereby sever sod 132 close to the side edge 37. As the device 10 is moved forwardly along the curb or sidewalk 38, the shoe plate 84 is oscillated upwardly and downwardly relative to the device 10, so that the sod 132 thereunder is loosed in advance of the rotor 118 and the rotor blades 120 have a sod-cutting action which combines the rotation of the rotor with vertical oscillation of the shoe plate. The divergent cutting side edge 88 of the shoe plate 84 tends to move sod toward the rotor 118. As shown in Figure 4, the side cutting edge 88 of the shoe plate 84 reaches beyond the outer side of a crescent-shaped, longitudinally elongated vertical plane guide plate 134 which is secured along and depends from the spring plate 82 at the edge thereof adjacent to the rotor 118. The guide plate 134 has a curved and bevelled lower cutting edge 136 which extends below the shoe plate and below the rotor 118. The guide plate 134 is arranged to be kept sliding along the curb side edge 37 as the device is moved along the curb, so that the device 10 is accurately guided along the curb, with the rotor 118 safely spaced therefrom and cutting into the sod 132 so as to form a sod edge 138 which is clearly and uniformly spaced from the curb side edge 37. Obviously, the contact of the guide plate 134 with the curb side edge 37 precludes injurious contact of the rotor 118 with the curb 38.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An edger comprising a generally horizontal frame having forward and rear ends, upstanding handle means on the rear end of the frame, a single curb-engaging wheel on and depending from said frame at the rear end thereof, a transverse horizontal axis vertical plane sod cutting rotor journaled on the frame at the forward end thereof, a shoe assembly pivoted on said frame on a horizontal transverse axis in the region of the axis of said rotor, said shoe assembly having a depressed forward end and having a horizontal shoe plate arranged to slide along a curb top at a curb side edge and a vertical plate to slide along a curb side edge as the edger is moved along a curb adjacent sod, an eccentric journaled on the frame behind said rotor, means connecting the eccentric to said assembly for oscillatory movement of said assembly about the horizontal transverse axis relative to the frame and the rotor, and motor means mounted on said frame and operatively connected to the eccentric and to the rotor.

2. An edger according to claim 1, wherein said shoe assembly comprises a rearwardly inclined spring plate having a journal on its elevated rear end circumposed on said eccentric, said shoe plate being secured to and depending from said spring plate along an adjacent side of the rotor.

3. An edger according to claim 1, wherein said shoe assembly comprises a rearwardly inclined spring plate having a journal on its elevated rear end circumposed on said eccentric, said shoe plate being secured to and depending from said spring plate along an adjacent side of the rotor and having a longitudinally curved sod cutting lower edge spaced below said rotor.

4. An edger according to claim 1, wherein said shoe assembly comprises a rearwardly inclined spring plate having a journal on its elevated rear end circumposed on said eccentric, said shoe plate being secured to and depending from said spring plate along an adjacent side of the rotor, and having a longitudinally curved sod-cutting lower edge spaced below said rotor, said rotor comprising a diametrically elongated plate having a central portion and elongated blades extending therefrom and having sod-cutting ends.

5. An edger according to claim 1, wherein a motor mounting base is secured across said frame at the rear end thereof and has a bottom wall, said motor means being secured upon the mounting base, said eccentric being mounted on the base bottom wall.

6. An edger according to claim 1, wherein a motor mounting base is secured across said frame at the rear end thereof and has a bottom wall, said motor means being secured upon the mounting base, said eccentric being mounted on the base bottom wall, said frame being U-shaped and having spaced side members between which said motor mounting base extends, said rotor having a rotor shaft extending between and journaled on said side members.

7. An edger according to claim 1, wherein a motor mounting base is secured across said frame at the rear end thereof and has a bottom wall, said motor means being secured upon the mounting base, said eccentric being mounted on the base bottom wall, said frame being U-shaped and having spaced side members between which said motor mounting base extends, said rotor having a rotor shaft extending between and journaled on said side members, said single curb-engaging wheel being located at the center of gravity of the edger and in longitudinal alignment with said shoe assembly.

8. An edger comprising a mobile frame having a forward end, a transverse horizontal axis vertical plane sod cutting rotor journaled on the frame at the forward end thereof, a shoe assembly including a horizontal shoe plate arranged to slide along a curb top at a curb side edge disposed in cooperative relation with respect to said rotor and pivoted on said frame on a horizontal transverse axis, a rotary shaft, an eccentric on said shaft, and means connecting the eccentric to said assembly for oscillatory movement of said assembly about the horizontal transverse axis relative to said rotor.

9. An edger comprising a mobile frame having a forward end, a transverse horizontal axis vertical plane sod cutting rotor journaled on the frame at the forward end thereof, a shoe assembly having a horizontal shoe plate arranged to slide along a curb top at a curb side edge and a vertical plate to slide along a curb side edge as the edger is moved along a curb adjacent sod disposed in cooperative relation with respect to said rotor and pivoted on said frame on a horizontal transverse axis, a rotary shaft, an eccentric on said shaft, and means connecting the eccentric to said assembly for oscillatory movement of said assembly about the horizontal transverse axis relative to said rotor.

References Cited in the file of this patent

UNITED STATES PATENTS

| | | |
|---|---|---|
| 1,238,595 | Sundholm | Aug. 28, 1917 |
| 1,644,068 | McBride | Oct. 4, 1927 |
| 2,624,938 | Davis | Jan. 13, 1953 |
| 2,664,807 | Hedrick | Jan. 5, 1954 |